Dec. 16, 1947.  P. W. LANG  2,432,527
KEYBOARD CONTROL SYSTEM
Filed Oct. 27, 1945  8 Sheets-Sheet 1

Fig. 1.

Inventor
Paul W. Lang
By John Q. Brody
Attorney

Fig. 2.

Dec. 16, 1947.   P. W. LANG   2,432,527
KEYBOARD CONTROL SYSTEM
Filed Oct. 27, 1945   8 Sheets-Sheet 4

Fig. 5.

Inventor
Paul W. Lang
By John B. Brady
Attorney

Dec. 16, 1947.                P. W. LANG                 2,432,527
                        KEYBOARD CONTROL SYSTEM
                        Filed Oct. 27, 1945          8 Sheets-Sheet 6

Inventor
Paul W. Lang.
By John O. Brody
Attorney

Inventor
Paul W. Lang
By John B. Brody
Attorney

Patented Dec. 16, 1947

2,432,527

UNITED STATES PATENT OFFICE 2,432,527

KEYBOARD CONTROL SYSTEM

Paul W. Lang, Hollywood, Calif., assignor of twenty per cent to Sidney Robert Gordon, Sharon, Mass.

Application October 27, 1945, Serial No. 625,019

8 Claims. (Cl. 250—41.5)

My invention relates broadly to keyboard control systems and more particularly to an electrically operated keyboard control system.

One of the objects of my invention is to provide an arrangement of an electrically operated keyboard control system which is silent in its operation for performing a multiplicity of control functions.

Another object of my invention is to provide a keyboard control system which is applicable to a wide variety of mechanical and electrical equipments, such as, typewriters, electric organs, pianos, calculating machines, counting machines, Linotype machines, printing telegraph apparatus, and other remote control devices.

A further object of my invention is to provide a keyboard operated system in which a casing is arranged for housing a light source and wherein the casing is externally formed to provide a multiplicity of finger positions arranged in tiers across which beams of light emanating from a light source are directed and focused upon photo-sensitive cell units arranged in electrical control circuits and wherein the control circuits may be functioned by the selective interruption of the individual light beams upon movement of the fingers with respect to the finger positions.

A still further object of my invention is to provide a construction of housing for a keyboard control system having a light source disposed interiorly of the housing and in which the exterior of the housing is arranged in step by step formation to provide a multiplicity of finger positions representing selective control positions across which light beams from the light source within the housing are externally directed to photosensitive units within the housing, each operative to control the activation of a control circuit for performing selective functions upon the interruption of the continuity of the light beams by movement of the fingers over the finger positions of the keyboard control system.

Still another object of my invention is to provide an arrangement of mounting a multiplicity of photocell units within a keyboard control housing for individual activation by light beams directed through apertures disposed in angular directions through the housing and across finger positions external of the housing for selectively controlling the photocell units and correspondingly controlling circuits associated thereto.

A still further object of my invention resides in the internal arrangement of a keyboard control system for the proper positioning of photocell units, a light source, and reflecting means for the selective direction of light beams in the course of the passage thereof across external paths adjacent finger control positions external of the housing for the selective control of circuits associated with said photocell units.

Other and further objects of my invention reside in the construction of a keyboard control system for effecting various circuit permutations and combinations by the selective interruption of beams of light across the finger control positions of a keyboard, as set forth more fully in the specification hereinafter following by reference to the accompanying drawings in which:

My invention is directed to a keyboard control system including a housing which encloses a suitable light source and is externally shaped to provide an angularly inclined external surface formed in tiers. The tiers constitute rows formed by rear wall portions and substantially normally disposed finger positions contiguous thereto. The rear wall portions and the finger positions are arranged in step by step formation, the finger positions having applied thereto the designations necessary for the operation of the particular equipment to which the control system of my invention is applied. In the case of an electric typewriter the designations are alphabetical characters, punctuation marks, fractions, shift control designations, accounting insignia, numerals, etc. In the case of musical instruments the designations indicate the musical keyboard. In the case of calculating machines the finger positions have designations indicating numerals similar to those appearing on the standard computing machine keyboard. In the case of remote control systems the designations indicate various functions which are to be carried out by operation of the finger controls.

In the several applications of my invention the step by step formation of the housing includes an arrangement of apertures angularly disposed and extending through the rear wall and the associated finger position of each of the key control positions of the keyboard. A light beam projects through these aligned apertures in a position immediately adjacent the longitudinally curved surface of each finger control position of the keyboard. That is to say, the light beam extends in an angular direction closes to the surface of each finger position and almost parallel to the finger position and sufficiently inclined for directing the projected light beam downwardly into the casing to reflective means internally of the casing and compactly assembled in shielded positions with respect to the light source which provides radiant energy for the necessary adjacent tier of operating keys. The reflective means serves to direct the light beams to individual photoelectric cell units which are individually shielded one with respect to another for the independent activation of the several photoelectric cell units by the several individual light beams. The photoelectric cell units are connected in separate control circuits for individually operating the different control circuits according to the selective interruptions of the light beam extending across the individual finger positions of the keyboard. The control circuits may be operated in reverse order, the circuits being maintained activated by the emanations from the light source to the several photocell units until selectively interrupted by the operation of the keyboard control system of my invention upon movement of the fingers of the operator into the path of light beams.

For performing functions comparable to the spacing operation of typewriters of conventional construction I arrange a horizontally directed light beam adjacent the forward portion of the base of the keyboard so that in any transverse position along the keyboard the operator may interrupt the horizontally directed light beam for correspondingly deactivating a horizontally aligned photocell unit arranged to correspondingly control a circuit for carrying out a spacing function on the electric typewriter.

Referring to the drawings in more detail, reference character 1 designates a casing or housing for the keyboard structure of my invention. In the particular embodiment of my invention illustrated I have selected the application of my invention to an electric typewriter, but it is to be understood that the disclosure herein is to be considered in the illustrative sense and not in the limiting sense as the principles of my invention are subject to embodiment in various forms for application to electric organs, pianos, calculating machines, counting machines, printing telegraph apparatus, Linotype machines, telephone switching devices, manual control switch systems generally and other remote control devices. In the embodiment shown the casing 1 is molded from plastic material or cast from metal or otherwise inexpensively fabricated or formed to provide a streamlined ornamental enclosure with an angularly inclined front portion 2 sloping toward the front of the casing. The inclined front portion of the casing is arranged in tiers of finger positions represented at 3, 4, 5, and 6. I have shown the finger positions in each tier by reference characters 7, 8, 9, and 10, respectively. Each finger position includes a longitudinally extending recessed portion 7a, 8a, 9a, and 10a, respectively, curved to substantially conform with the contour of the fingers and each separated one from another by an intermediate ledge or projection represented at 7b, 8b, 9b, and 10b, respectively.

Each of the tiers of finger positions terminates in a rear wall portion which I have shown at 7c, 8c, 9c, and 10c, respectively. The finger positions are each provided with slits for the passage of an extremely narrow beam of light therethrough, the slits being disposed on an angle in alignment with correspondingly shaped slits in the coextensive rear wall portions which are associated with the finger positions. The aligned slits are so arranged that a light beam from a light source 15 interiorly of the casing 1 may be directed through the aligned slits in paths which extend external to the casing 1 immediately adjacent the finger positions. That is to say, the recesses 7a, 8a, 9a, and 10a are provided with slits 7d, 8d, 9d, and 10d respectively, the said slits extending in alignment with correspondingly shaped slits 7e, 8e, 9e, and 10e in the rear wall portions 7c, 8c, 9c, and 10c, respectively.

The light beams which are initiated interiorly of the casing 1 and which project exteriorly of the casing 1 immediately adjacent the recesses in each of the finger positions re-enter the casing 1 and are directed toward a reflecting surface or mirror which I have represented at 8f, 9f, and 10f. These mirrors are formed from narrow strips which are angularly disposed interiorly of the casing 1 and behind the rear wall portions 8c, 9c, and 10c, respectively.

The light source 15 is formed from a continuous serpentine tube which is disposed behind each of the rear wall portions 7c, 8c, 9c, and 10c for directing light rays through the slits 7e, 8e, 9e, and 10e, respectively. To eliminate spectral interference from the light source 15 with photoelectric cell units arranged within casing 1, I cover the light source 15 with a light opaque paint or other material leaving only a narrow slot 15a extending longitudinally thereof and alignable with the slits 7e, 8e, 9e, and 10e in the rear wall portions of the tiers of finger positions in the casing 1 for the projection of a beam of light 15b therefrom.

Figures 7, 8, 9, 10:
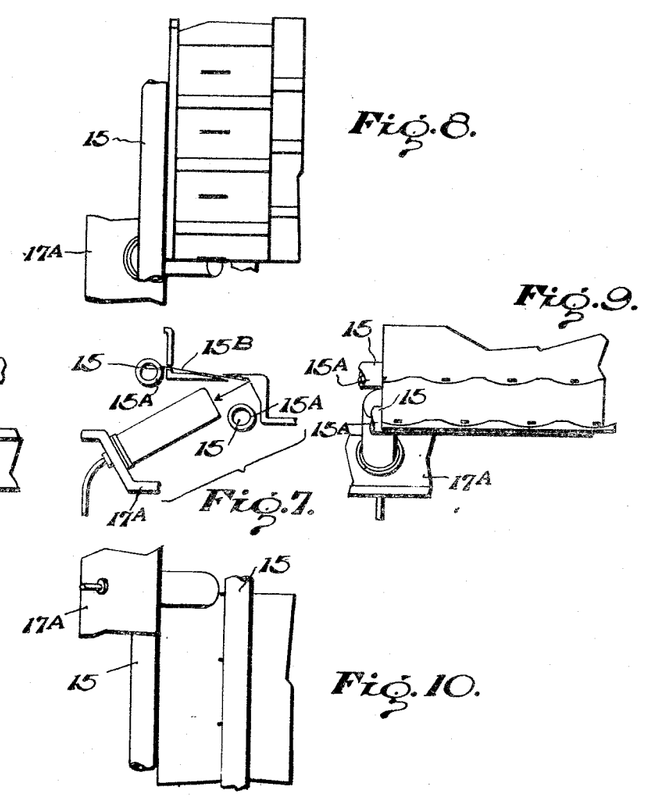
Fig. 7 is a fragmentary cross-sectional view on an enlarged scale with certain of the parts illustrated in side elevation and illustrating one of the individual light ray control units employed in the system of my invention.
Fig. 8 is a fragmentary top plan view on an enlarged scale showing two tiers of the finger control positions in the electric typewriter of my invention.
Fig. 9 is a fragmentary front elevational view of the two tiers of finger positions of the electric typewriter illustrated in Fig. 7.
Fig. 10 is an enlarged bottom plan view of a fragmentary portion of the keyboard looking from a direction interiorly of the casing.
Figure 11:
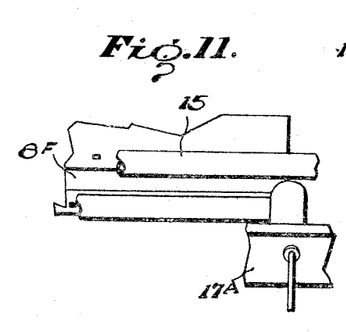
Fig. 11 is a rear elevational view of the electric typewriter and looking in a direction interiorly of the casing.
Figure 16:
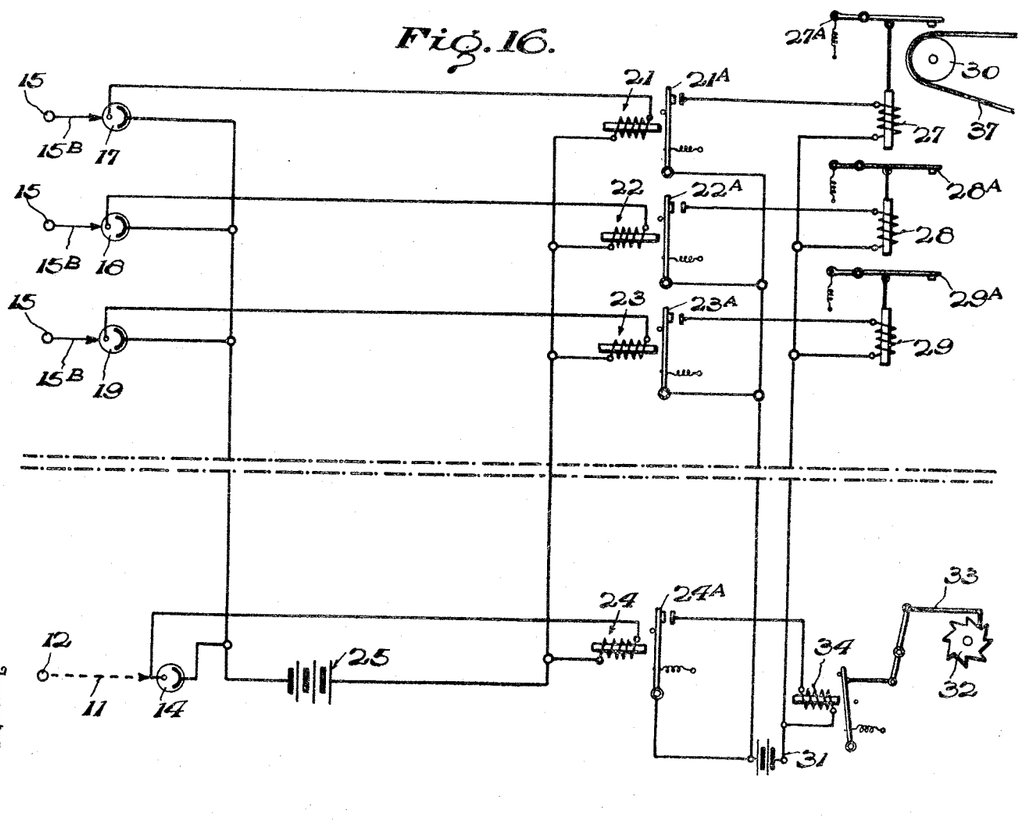
Fig. 16 is a schematic wiring diagram of one form of circuit which I may utilize in carrying out the principles of my invention.

I provide rows of miniature photoelectric cells 17, 18, 19, and 20 in alignment with the finger positions 7, 8, 9 and 10 of the keyboard, arranged interiorly of the casing 1 on supports which I have represented, for example, at 17a in Fig. 7. The photoelectric cells in the rows designated at 17, 18, 19, and 20 are each connected to individual control circuits which I have represented, for example, in Fig. 16 at 21, 22, 23, etc. The control circuits illustrated each include a miniature relay having a movable armature member 21a, 22a, 23a, etc., normally maintained in activated position by virtue of the direction of the light beam 15b from light source 15 upon the photoelectric cells 17, 18, 19, etc. The source of potential 25 supplies energy to each of the control circuits 21, 22. and 23, etc. The control circuits each individually control solenoids represented at 27, 28, and 29, respectively, energizable from source 31 upon interruption of the light beam 15b by the passage of the finger of an operator across the externally projected light beam. The solenoid windings 27, 28, and 29, etc. control keybar mechanisms 27a, 28a, and 29a, respectively which are operative against web 37 passing over platen 30 for effecting an impression on a paper sheet carried by web 37 corresponding to the symbol on the control keyboard associated with the light beam 15b which is interrupted.

The spacing function for such application of my invention as a typewriter is carried out by providing a transversely extending light beam in a transverse association with the keyboard as distinguished from the multiplicity of longitudinally extending light beams 15b. The transversely extending light beam emanates from a light source designated at 12 interiorly of casing 1 which directs a narrow beam of light to an aligned slit in the opposite wall of casing 1 to a photoelectric cell 14 mounted interiorly of casing 1. The light beam in the path 11 when interrupted at any transverse position along the path thereof results in the deactivation of miniature relay 24 illustrated in Fig. 16 releasing armature 24a and closing a circuit from source 31 to solenoid 34. Solenoid 34 operates a pawl 33 coacting with ratchet 32 for the step by step operation of the spacing mechanism of the electric typewriter. One impulse activates solenoid winding 34 for each interruption of the transverse beam correspondingly functioning the spacing mechanism.

My reference herein to the particular control circuits which are functioned by momentary manual selective interruptions of the externally propagated light beams are wholly illustrative of the principles of my invention. In a preferred arrangement of the electric typewriter of my invention I provide magnetically operated control means for the individual characters, numerals, punctuation marks, and symbols of the control keyboard by which direct impressions are effectuated on the paper sheet carried by the web 37. The excitation of such magnetically operated control means is effected by the individual photoelectric cells to which the light-activating beams are selectively interrupted.

Figure 1:
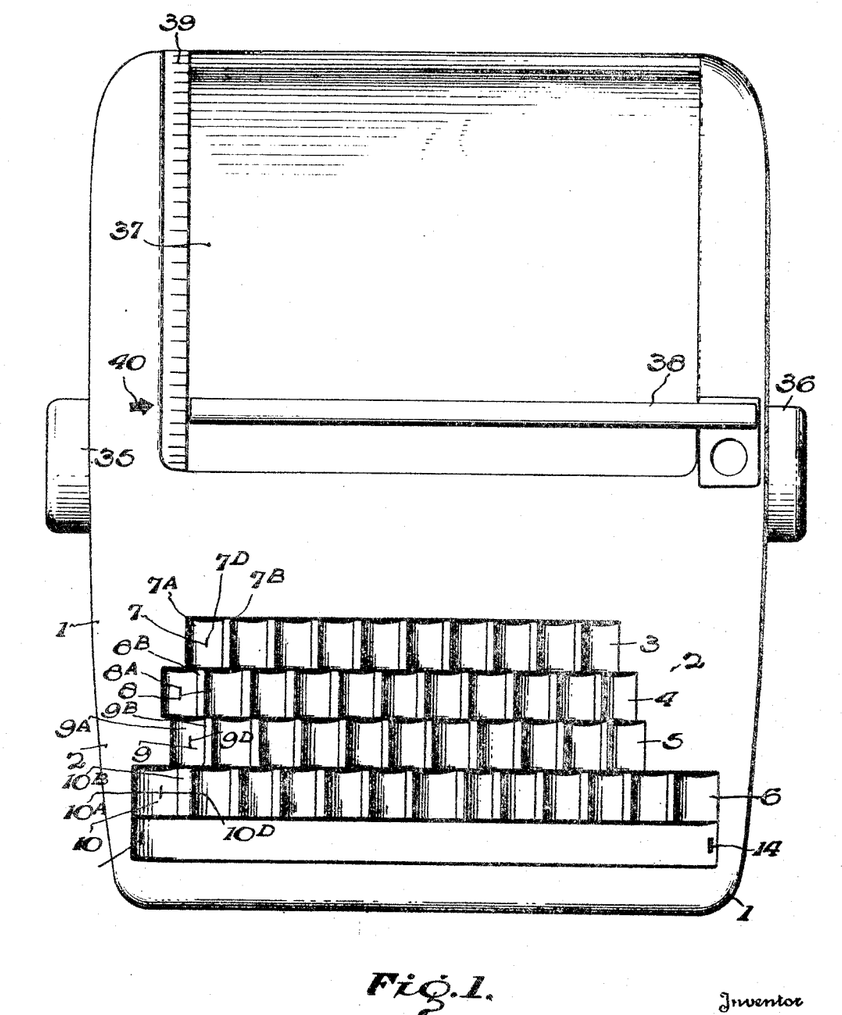
Figure 1 is a top plan view of the keyboard system of my invention illustrated as applied to an electric typewriter.
Figure 2:
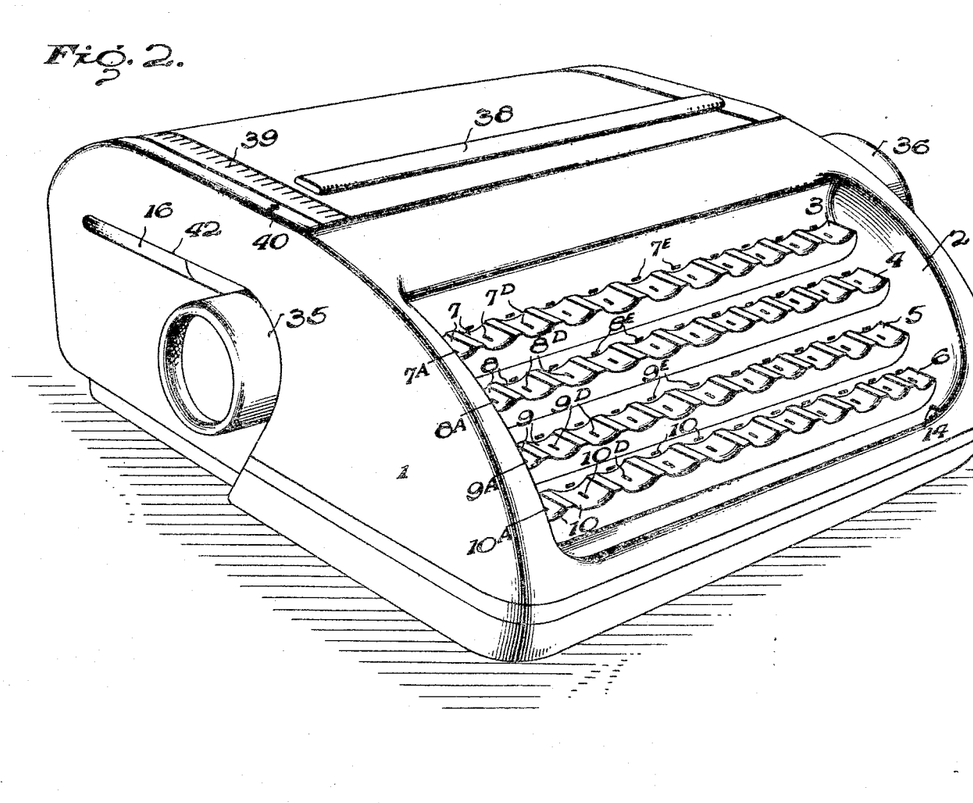
Fig. 2 is a perspective view of the keyboard system and electric typewriter illustrated in Fig. 1.
Figures 3, 4:
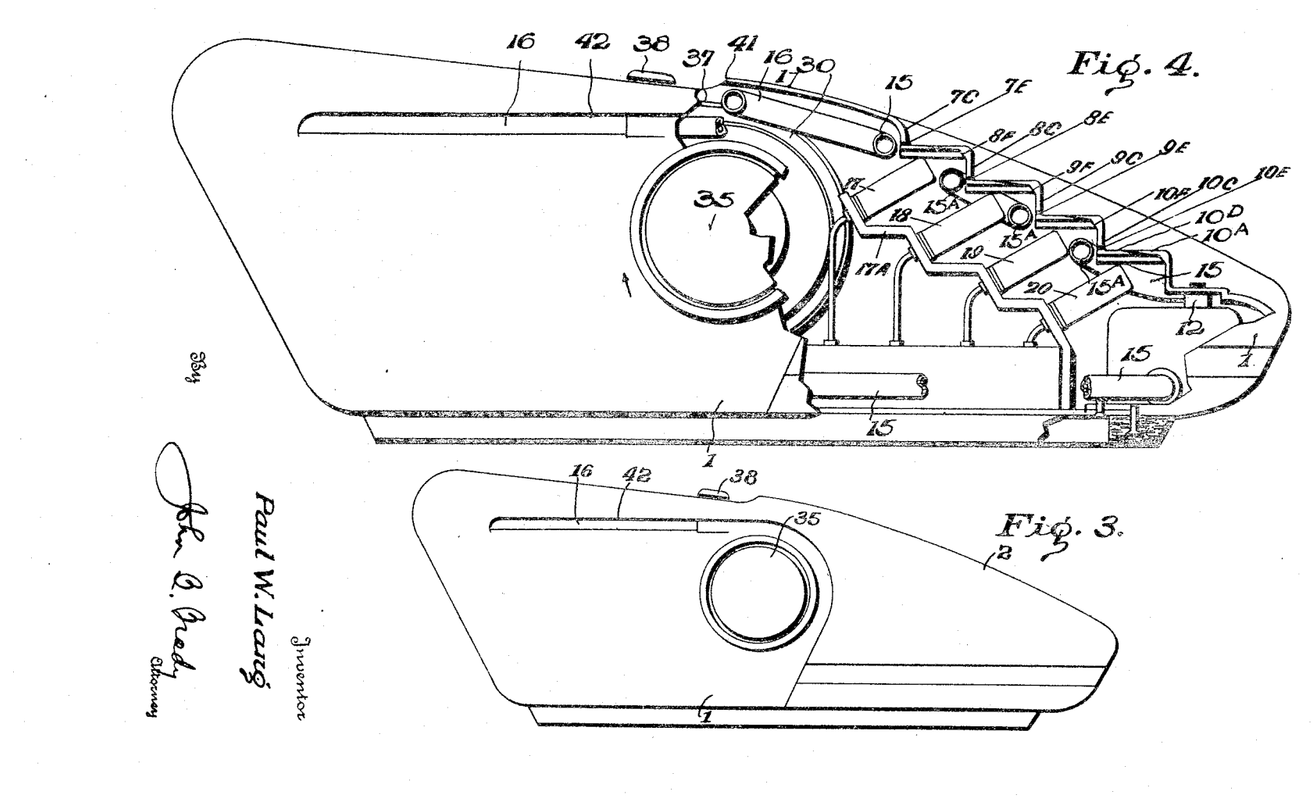
Fig. 3 is a side elevational view of the keyboard control system and typewriter illustrated in Figs. 1 and 2.
Fig. 4 is a side elevational view similar to the view shown in Fig. 3 but broken away to show the interior of the control circuits for the electric typewriter.
Figure 5:
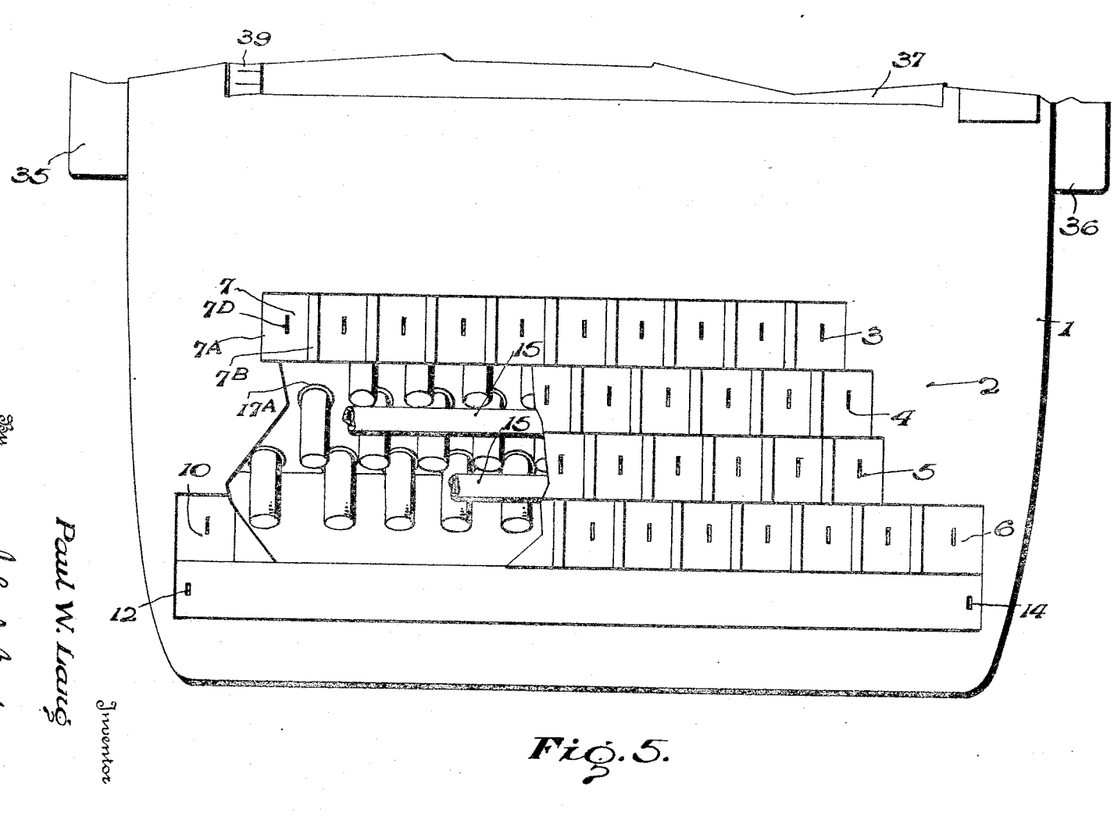
Fig. 5 is a fragmentary top plan view of the keyboard partially broken away to illustrate the interior arrangement of the parts thereof.
Figure 6:
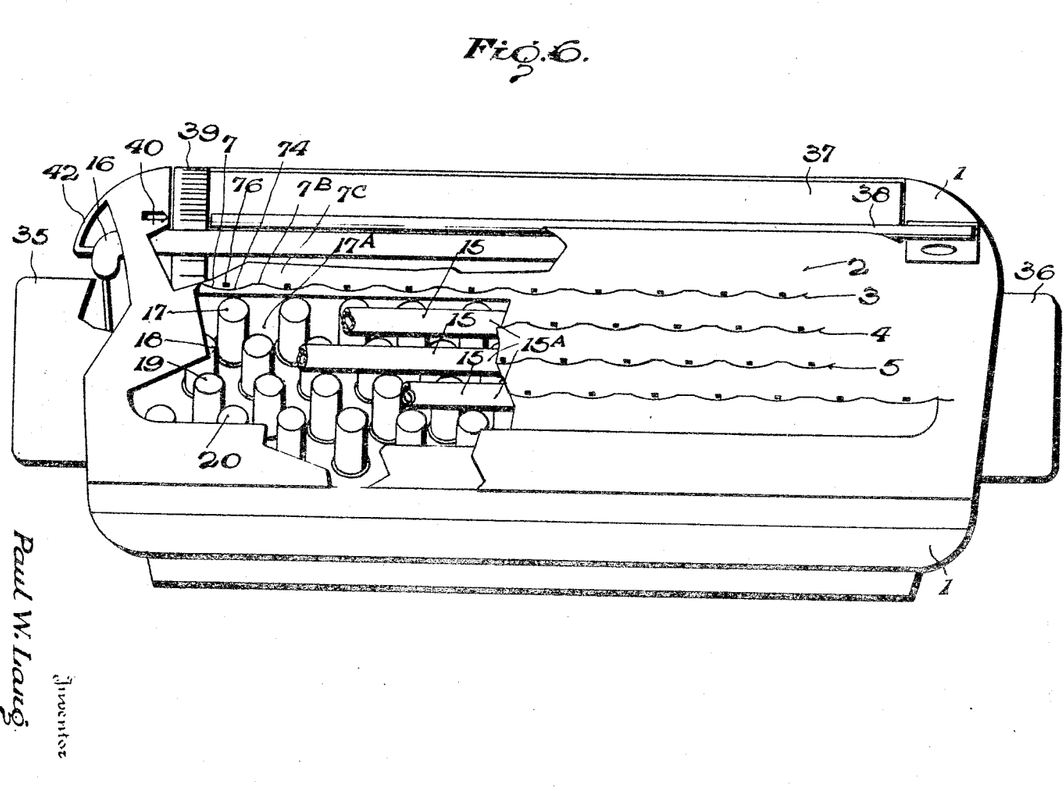
Fig. 6 is a front view of the electric typewriter of my invention with a portion thereof broken away to illustrate the arrangement of photoelectric cell system within the casing of the typewriter.

I provide manually controllable means for rotating the platen of the electric typewriter, such as knobs 35 and 36 which extend on opposite ends of the casing 1. The platen, controlled by knobs 35 and 36, controls the movement of web 37 which is adapted to feed and carry the paper sheets beneath the typing mechanism. The web 37 is of an endless band type carrying a marginal scale 39 operative in coaction with indicator 40 carried by casing 1 on one edge thereof to which reference may be conveniently made in aligning the paper sheets with the web 37. The endless web 37 is mounted on two rollers in addition to the platen previously described for guiding the web within the casing 1. The typing mechanism in the form of my invention illustrated in Fig. 1 is of the magnetic operating type supported by horizontal bar 38 above the paper sheets which are fed by the web 37. I may employ the solenoid operated type bar mechanism at this position or in a remote position or in a separately arranged housing.

In the form of my invention illustrated in Figs. 1–12 I so locate the light source 16 interiorly of the casing that the paper sheet which is fed by web 37 beneath the typing mechanism 38 is illuminated by light rays directed upwardly beneath the edge 41 of the casing 1. To facilitate lighting of the copy for the convenience of the operator at either side of the casing 1, I extend the light source 15 at either side of the casing 1 in the positions represented at 42 for allowing adequate illumination on copy at opposite sides of the typewriter.

Figure 12:
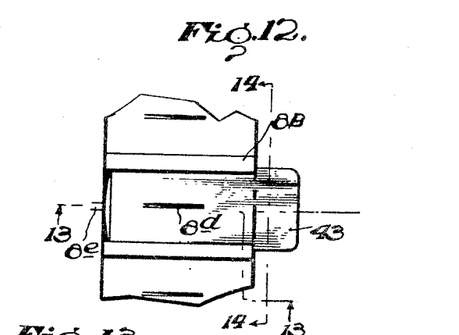
Fig. 12 is a fragmentary plan view of one of the finger positions and illustrating the form of finger position extension device which I may mount at certain of the finger positions to enable the operator to conveniently operate the keyboard in a manner in which many operators are experienced, wherein certain of the fingers may rest upon a finger position extension member without unintentionally interrupting the light beam individual to that particular finger position.
Figure 13:
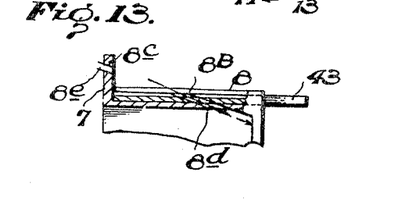
Fig. 13 is a transverse sectional view taken substantially on line 13—13 of Fig. 12.
Figure 14:
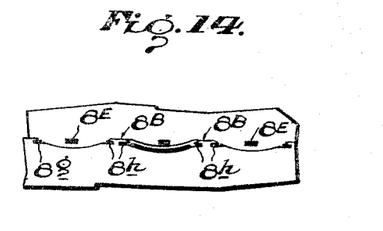
Fig. 14 is a fragmentary front elevational view showing the manner of attachment of the finger position extensions looking in the direction of line 14—14 of Fig. 12.
Figure 15:
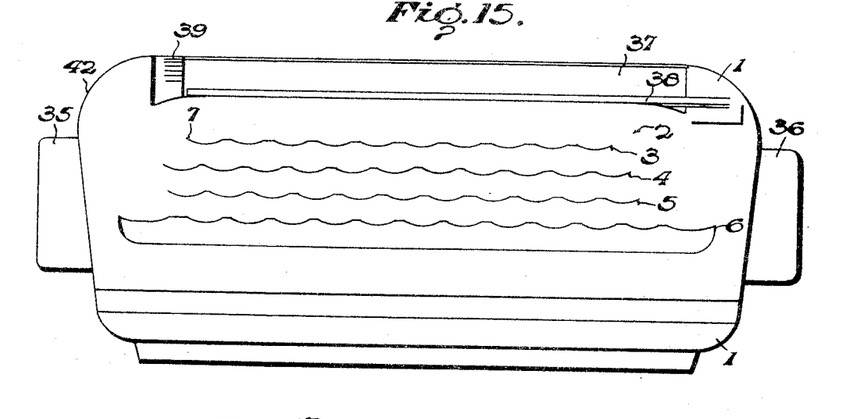
Fig. 15 is a front elevational view of the electric typewriter of my invention.

In order to increase the convenience of operation of the keyboard where the system of my invention is applied to electric typewriters, I arrange for an attachment for certain of the finger positions of the keyboard as represented in Figs. 12, 13 and 14. I apply to the desired finger positions a longitudinally extending strip member of plastic or other material as represented in Figs. 12, 13 and 14. The finger position 8 has been illustrated extending to the rear wall 8c and having the recessed portion 8a and the ledge portion 8b with the attachable cover member 43 secured thereto by engagement in grooves 8g and 8h. In the form of keyboard where it is desired to provide for the attachment 43 the ledge portions 8b are grooved immediately below the heads thereof to serve as guides for the insert 43. The insert 43 is formed from a transparent plastic so that it offers no obstruction to the passage of light rays through the slit 8d and the aligned slit 8e. The insert 43 serves as a projection on certain of the finger positions in the tier 6 to serve as a rest for certain of the fingers of the operator in high speed operation of the keyboard. Because of the grooved arrangement of the ledge portions 8b the inserts 43 may be slipped into the positions in which they will meet the convenience of various operators.

The principles of my invention are applicable to keyboard control mechanisms for performing many other functions beyond those described in connection with the electric typewriter hereinbefore set forth. Equally desirable operation is obtained in applying the principles of my invention to electric pianos, electric organs, calculating machines, printing telegraph instruments, and as a substitute for the dial actuator of dial-operated telephones as well as switching systems generally wherever a pre-arranged pattern device is to be manually operated. The control system of my invention is also operative by foot control as well as finger control as heretofore explained. In each application of my invention a pre-arranged keyboard pattern is provided adjacent which the light beams are propagated subject to manual interruption in operating the keyboard system. As illustrated herein, the finger positions are provided with alphabetical and numerical designations, punctuation marks, fractions, etc. In applying the system of my invention to other mechanisms, designations pertinent to the operation of such mechanisms are substituted for the designations I have represented herein.

While I have described my invention in certain of its preferred embodiments, I realize that modifications may be made and I desire that it be understood that I intend no limitations upon my invention other than may be imposed by the scope of the appended claims.

What I claim as new and desire to secure by Letters Patent of the United States is as follows:

1. A keyboard control system comprising a supporting casing, a multiplicity of finger positions integrally formed with said casing and projecting along substantially longitudinal parallel axes from said casing in a multiplicity of tiers, each of said finger positions being recessed to provide a curved contour substantially conforming with the tips of the fingers a light ray tube extending in a serpentine path above each of said finger positions within said casing, means for projecting individual needle-like light beams from said tube from a position interiorly of said casing downwardly through apertures in each of said finger positions, photoelectric cells within said casing disposed in the path of said needle-like light beams and controllable by the needle-like light beams passing downwardly through said finger positions and electrical circuits controlled by said photoelectric cells and operative in different permutations and combinations according to the selective covering or uncovering of the apertures in said finger positions by the tips of the fingers.

2. In a keyboard control system a casing having tiers of finger positions projecting therefrom, a light source disposed in a serpentine path within said casing, each tier of finger positions being formed by a multiplicity of curved recesses abutting edge to edge and having operating designations therein, each finger position having an angularly disposed aperture extending therethrough at the lowest level of the curved recess therein said casing being apertured in alignment with the aperture in said finger positions for directing needle-like beams of light from said serpentine path light source therethrough, light sensitive cells within said casing disposed in alignment with light beams reflected through the apertures in each finger position and control circuits operated by each of said light-sensitive cells upon interruption of the beams of light projecting through said finger positions.

3. A control board for manual manipulation comprising in combination with a base structure a multiplicity of finger controls including a light aperture individual to each finger control, a light ray tube arranged in a serpentine path constituting a light source disposed within said base structure for simultaneously directing a needle-lie beam of light downwardly through all of said light apertures from said light ray tube in needle-like beams projecting in substantially spaced longitudinally extending parallel paths, a manually controllable needle-like beam of light projecting substantially transverse to the aforesaid needle-like beams of light, light-sensitive cells arranged in the paths of the longitudinal and transverse light beams projected through the light apertures, and control circuits operated by said cells according to the selective manual interruption of the longitudinal light beams at said finger controls and according to the interruption of the transversely projecting beam of light.

4. A selective control system comprising in combination with a casing structure apertured in a plurality of positions according to a prearranged pattern having designating symbols associated with each apertured position, a light ray tube extending in a serpentine path and constituting light source within said casing structure and arranged adjacent apertures in said casing structure in alignment with the aforesaid apertured positions for directing light rays downwardly from within said casing in a path exteriorly thereof and downwardly through said apertured positions, photoelectric cells arranged within said casing in individual alignment with the light rays directed through said apertures and said apertured positions, and control circuits operated by said photoelectric cells, whereby the individual beams of light from said serpentine path light ray tube may be selectively interrupted at any one of said designations manually for operating said control circuit in desired sequence.

5. A keyboard control system comprising a supporting casing enclosing a light source disposed in a serpentine path and having an external surface disposed in a substantially inclined plane having a step by step formation constituting a finger control position and a rear wall extending substantially vertically therefrom, said finger control position and the associated rear wall position each being apertured for the external passage of a beam of light in a downward direction from the serpentine light source within said casing through the rear wall and through the finger control position to a position within said casing, photoelectric cells arranged interiorly of said casing in the path of said projected beams of light, control circuits operated by each of said photoelectric cells and extension members for certain of said finger control positions serving as rests for the operator's fingers substantially removed from the apertured portion of the associated finger control positions.

6. A keyboard control system comprising a supporting casing enclosing a light source disposed in a serpentine path and having an external surface disposed in a substantially inclined plane having a step by step formation constituting a finger control position and a rear wall extending substantially vertically therefrom, said finger control position and the associated rear wall position each being apertured for the downward external passage of a beam of light from the serpentine light path source within said casing through the rear wall and through the finger control position to a position within said casing, photoelectric cells arranged interiorly of said casing in the path of the beams of light projected through said finger positions, control circuits operated by each of said photoelectric cells, and attachable and removable finger rests engageable with certain of said finger control positions for supporting the fingers of the operator in positions remote from the passage of the beams of light through the associated finger control positions.

7. A control board for manual manipulation comprising a base structure including a multiplicity of finger control positions disposed in step-like arrangement including substantially vertically extending wall portions and substantially horizontally extending portions containing finger control positions, each finger control position including a longitudinally extending recessed portion curved to substantially conform with the contour of the tips of the fingers and terminating in parallel spaced longitudinally extending ledges intermediate each of said finger positions a serpentine luminous discharge tube having portions thereof extending longitudinally behind said substantially vertically extending wall portions, said substantially vertically extending wall portions and said finger positions being apertured in an angular direction for the projection of a needle-like light beam externally of said base structure from said light source interiorly of said base structure a photoelectric cell disposed interiorly of said base structure in reflective alignment with each of the apertured finger positions, the ledges intermediate said finger positions being longitudinally grooved, and finger rests slideable into and out of the said grooves and serving as a support for the fingers of the operator in positions remote from said finger control positions.

8. A control board for manual manipulation comprising a base structure including a multiplicity of finger control positions disposed in step-like arrangement including substantially vertically extending wall portions and substantially horizontally extending portions containing finger control positions, each finger control position including a longitudinally extending recessed portion curved to substantially conform with the contour of the tips of the fingers and terminating in parallel spaced longitudinally extending ledges intermediate each of said finger positions a serpentine luminous discharge tube having portions thereof extending longitudinally behind said substantially vertically extending wall portions, said substantially vertically extending wall portions and said finger positions being apertured in an angular direction for the projection of a needle-like light beam externally of said base structure from said light source interiorly of said base structure a photocell disposed within said base structure in reflective alignment with each of the apertured finger positions, the ledges intermediate said finger positions being longitudinally grooved, and finger rests of transparent material longitudinally slidable into and out of the longitudinal grooves in said ledges and serving as supports for the fingers of the operator while allowing the passage of light rays through said finger control positions for application to the photoelectric cells associated therewith.

PAUL W. LANG.

REFERENCES CITED

The following references are of record in the file of this patent:

UNITED STATES PATENTS

| Number | Name | Date |
|---|---|---|
| 2,228,780 | Roberts | Jan. 14, 1941 |
| 2,168,886 | Roberts | Aug. 8, 1939 |
| 2,234,832 | Potts | Mar. 11, 1941 |
| 2,129,866 | Page | Sept. 13, 1938 |